United States Patent [19]

Rilly et al.

[11] Patent Number: 5,448,469
[45] Date of Patent: Sep. 5, 1995

[54] SWITCH MODE POWER SUPPLY WITH OUTPUT FEEDBACK ISOLATION

[75] Inventors: Gerard Rilly, Unterkirnach; Jose Rodriquez-Duran, VS-Villingen, both of Germany; Kim-Ly Kha, Recologue, France

[73] Assignee: Deutsche Thomson-Brandt GmbH, Villingen-Schwennigen, Germany

[21] Appl. No.: 208,502

[22] Filed: Mar. 9, 1994

Related U.S. Application Data

[63] Continuation of Ser. No. 942,230, Sep. 3, 1992, abandoned.

[30] Foreign Application Priority Data

Feb. 15, 1990 [DE] Germany ............. 40 04 707.5
Feb. 6, 1991 [DE] Germany ................. 00227

[51] Int. Cl.⁶ ..................................... H02M 3/335
[52] U.S. Cl. ............................ 363/21; 363/97; 363/131
[58] Field of Search .............. 363/20, 210, 95, 97, 363/131

[56] References Cited

U.S. PATENT DOCUMENTS

| | | | |
|---|---|---|---|
| 3,564,393 | 2/1971 | Williamson | 323/288 |
| 3,771,040 | 11/1973 | Fletcher et al. | 363/21 |
| 4,037,271 | 7/1977 | Keller | 363/21 |
| 4,330,816 | 5/1982 | Imazeki et al. | 363/21 |
| 4,438,411 | 3/1984 | Rubin et al. | 363/21 |
| 4,546,421 | 10/1985 | Bello et al. | 363/97 |
| 4,561,046 | 12/1985 | Kuster | 363/21 |
| 4,593,213 | 6/1986 | Vesce et al. | 363/21 |
| 4,672,518 | 6/1987 | Murdock | 363/21 |
| 4,675,796 | 6/1987 | Gautherin et al. | 363/20 |
| 4,677,534 | 6/1987 | Okochi | 363/97 |
| 4,680,688 | 7/1987 | Inou et al. | 363/131 |
| 4,683,528 | 7/1987 | Snow et al. | 363/97 |
| 4,866,588 | 9/1989 | Rene | 363/97 |
| 4,885,674 | 12/1989 | Varga et al. | 363/97 |
| 4,890,210 | 12/1989 | Myers | 363/21 |
| 4,920,470 | 4/1990 | Clements | 363/21 |
| 4,924,369 | 5/1990 | Varadi | 363/21 |
| 4,926,303 | 5/1990 | Sturgeon | 363/97 |
| 4,958,268 | 9/1990 | Nagagata et al. | 363/97 |
| 5,029,269 | 7/1991 | Elliott et al. | 363/21 |
| 5,063,489 | 11/1991 | Inaba | 363/97 |
| 5,101,336 | 3/1992 | Willocx et al. | 363/131 |
| 5,126,931 | 6/1992 | Jitaru | 363/131 |
| 5,170,333 | 12/1992 | Niwayama | 363/21 |
| 5,278,748 | 1/1994 | Kitajima | 363/21 |

FOREIGN PATENT DOCUMENTS 0336725 10/1989 European Pat. Off. .... H02M 3/335

OTHER PUBLICATIONS

Patent Abstract of Japan 56-25376 vol. 5 No. 78 May 1981.

*Primary Examiner*—Jeffrey L. Sterrett
*Attorney, Agent, or Firm*—Joseph S. Tripoli; Joseph J. Laks; Daniel E. Sragow

[57] ABSTRACT

A switch mode power supply includes a transformer and a switching transistor for turning the primary of the transformer on and off. The secondary of the transformer is connected to a comparator which compares the output voltage to a reference voltage and provides a reverse current to the switching transistor to control the duty cycle of the switching transistor in accordance with the comparison.

3 Claims, 2 Drawing Sheets

SWITCH MODE POWER SUPPLY WITH OUTPUT FEEDBACK ISOLATION

This is a continuation of application Ser. No. 07/942,230, filed Sep. 3, 1992, now abandoned.

This is a continuation of PCT application PCT/EP 91/00227, filed Feb. 6, 1991 by Gerard Rilly, Jose Rodriguez-Duran and Kim-Ly Khy and titled "Combinational Circuit Component".

BACKGROUND OF THE INVENTION

This invention is directed to a switch mode power supply of the type described in EP 0 336 725 A2. With such a switch mode power supply, the amplitude of the operating voltage which is generated on the secondary side of a transformer, is stabilized by regulating the duty cycle of a switching transistor which is located on the primary side of the transformer. This control requires the transmission of a data signal, which is indicative of the amplitude of the operating voltage, from the secondary of the transformer to the primary of the transformer. However, this transmission, must not interfere with the electrical separation between the primary and the secondary sides of the transformer. Typically, in the prior art of the transmission of a data signal from the secondary to the primary of a transformer requires additional circuitry, such as a separate transmitter or an optocoupler.

SUMMARY OF THE INVENTION

It is an object of the invention to transmit, in a technically simple manner and without using additional circuitry, a control signal from the secondary winding to the primary winding of a transformer, while maintaining the electrical separation between the primary and secondary windings of the transformer.

With the invention, a transformer, which is typically used to transmit power from the primary winding to the secondary winding, is also used to transmit a control signal from the secondary to the primary. The transmission of the data signal occurs during a so-called rest period of the transformer during which the current through the primary winding is turned off by a power switch. The energy which is transmitted back to the transformer primary is kept relatively small. The regulation voltage on the primary winding can be derived from a voltage which is dependent upon the actual value of the reverse current and which is therefore dependent upon the values of the operating voltages generated at the secondary winding. Preferably the voltage on the primary side is evaluated during the rest period using a time window. The data signal voltage is then derived only from the voltage existing during the time window. It is also possible to derive the data signal from the steepness, or the amplitude, of a pulse edge which is also dependent upon the reverse current and upon the operating voltage at the secondary side. No additional winding of the transformer is required for the transmission of the data signal. A secondary winding, which at the same time serves for the generation of an operating voltage by means of a rectifier circuit, can be used for the transmission of the data signal. This secondary winding then supplies energy to the rectifier circuit during the working period and transmits a control signal used for the control operation to the primary side during the rest period. The energy transmission, and the data transmission thereby occur via the same windings, but at different times and in different directions.

A selected portion of the pulse voltage at the transformer is a measure for the regulating variable. The evaluation of the selected pulse portion can be generated in several different ways. In a first method, the voltage is keyed open at the transformer using a switching pulse during a time window. The switching pulse is provided by a processor which controls a switch mode power supply. The processor contains the information relative to the time within the working period that the voltage which is indicative of the regulatory information occurs. This voltage is then keyed open by a time window and rectified to derive the regulation voltage. In a second method the keying pulse is obtained from the pulse voltage itself. The individual pulse edges are evaluated by means of differential elements. It is then possible to derive a pulse marking the beginning of the time window. The desired keying pulse, which extends throughout the duration of the time window, can then be generated from this pulse in a pulse shaper.

BRIEF DESCRIPTION OF THE DRAWING

Preferred embodiments are illustrated in the drawings, in which.

DESCRIPTION OF EMBODIMENTS

Figure 1:
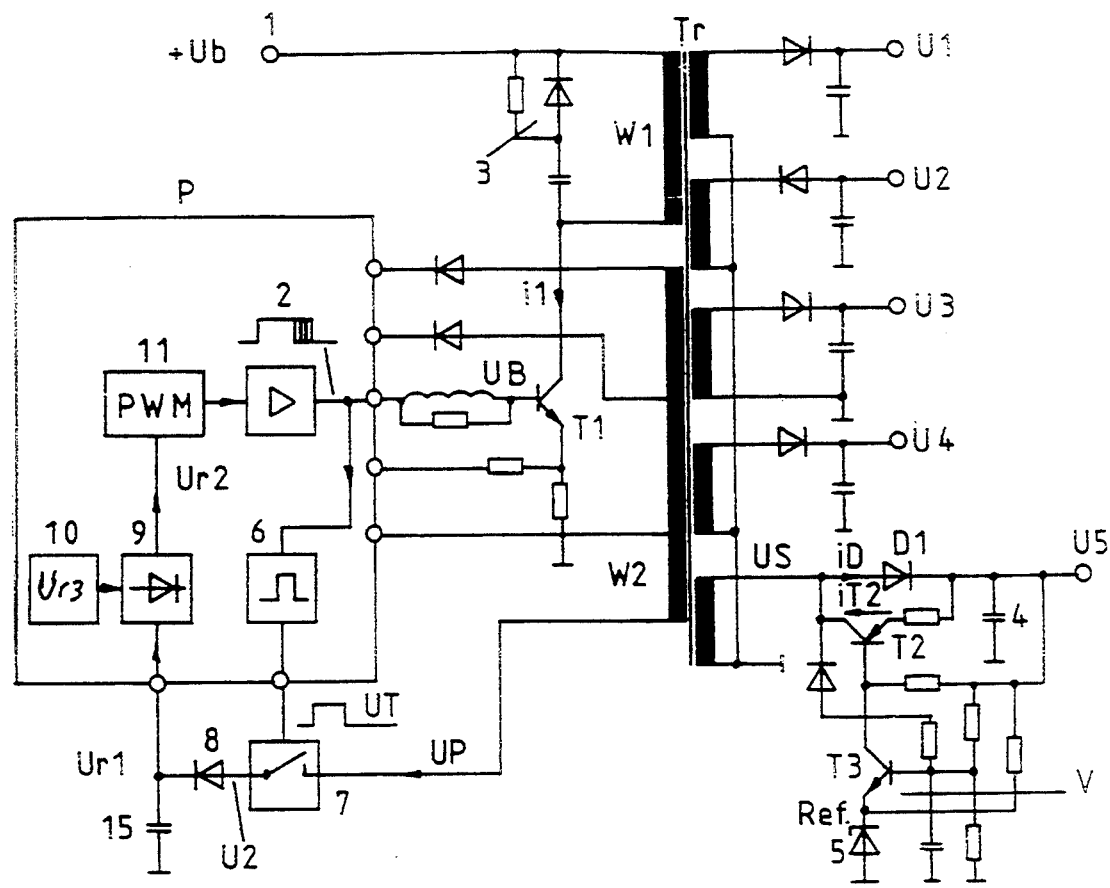
FIG. 1 is a preferred embodiment of a switch mode power supply, in a simplified form for carrying out the first technique.

In FIG. 1, a positive operating voltage $+Ub$ is applied to the input terminal 1. Voltage Ub is obtained by rectifying the main alternating current. Voltage Ub is connected via the primary winding W1 of a transformer Tr, to the collector of a power transistor T1, which operates as a switch. The transistor T1 is controlled by the processor P with a pulse width modulated voltage 2. Operating voltages U1, U2, U3, U4 and U5 are generated through several secondary windings and connected rectifiers. An RCD attenuator 3, also referred to as "snubber", is in parallel with the primary winding W1. Attenuator 3 limits the peaks and the edge sharpness of the voltage applied to transistor T1.

A transistor T2, is reversed polarized with respect to a diode D1 and is parallel to diode D1. The base of transistor T2 is controlled by a comparator circuit V. The mode of operation is explained in connection with FIG. 3. During the time period t1-t2 a current i1 flows through the primary winding W1 and the transistor T1. During time period t2-t3 a current iD flows through the diode D1 and charges a capacitor 4. At the time t3 the transistor T2 becomes conductive and supplies a reverse current iT2 from the charged capacitor 4 back into the transformer Tr. The energy transmitted at this time is relatively small. At the time t4 the transistor T2 is switched off. The voltage U2 is generated at the end of pulse voltage US from time t4-t5 by the reverse current iT2. The amplitude of U2 is dependent upon current iT2. The comparator circuit V compares the operating voltage U5 to the constant reference voltage Ref. at a Zener diode 5. Dependent upon this comparison, the transistor T2 is controlled to be more or less conductive and current iT2 and voltage U2 are also dependent upon voltage U5.

Figure 3:
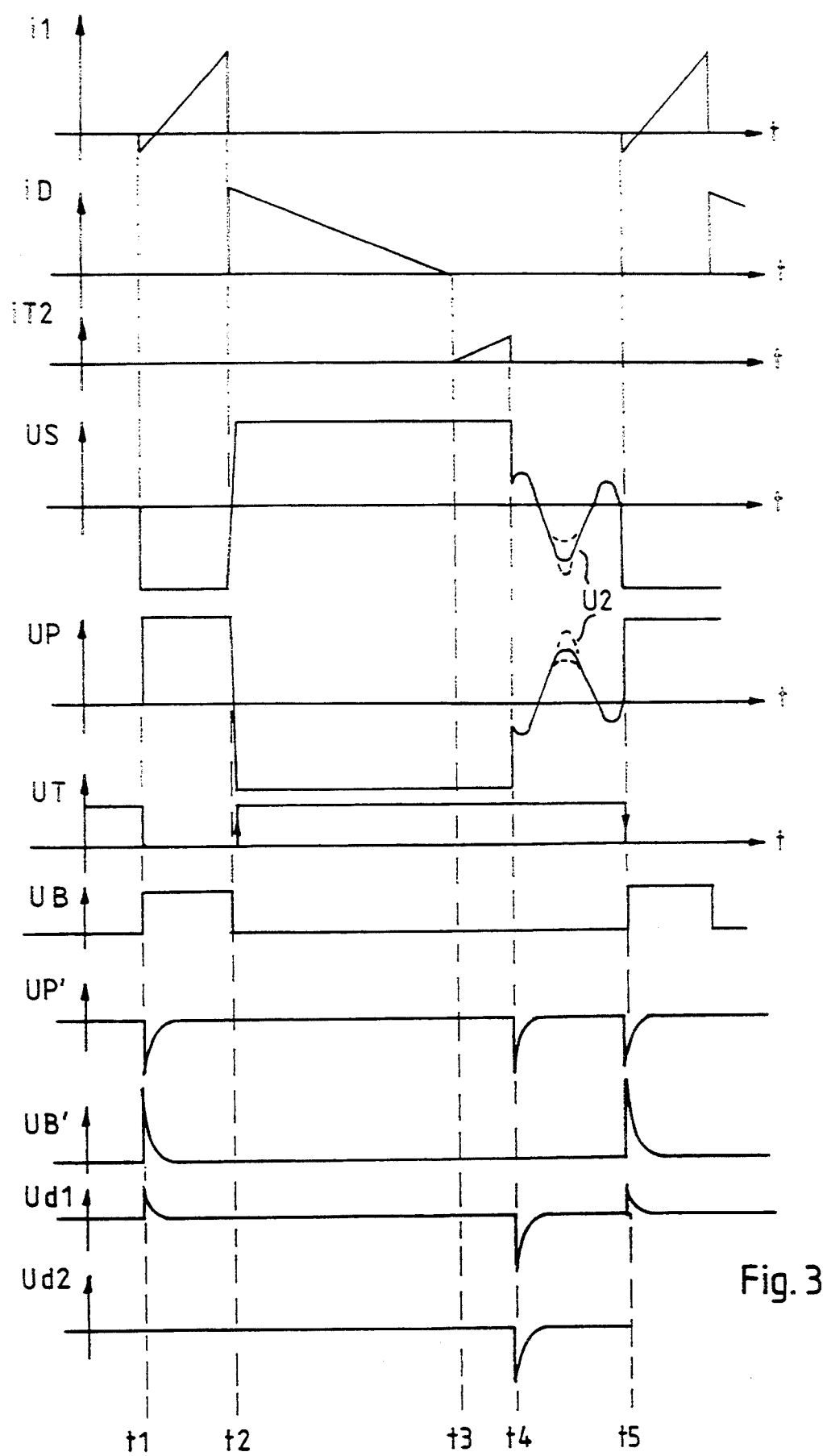
FIG. 3 shows the voltage and current waveforms used in FIGS. 1 and 2.

The voltage U2, which is the data, or regulatory signal, also appears at the primary winding W2 as part of the voltage UP. However, the phase is reversed for the U2 portion of voltages US and UP. The processor P includes a pulse shaper 6 to provide the keying pulse UT. The keying pulse UT is derived from the voltage UB and periodically controls the transistor T1 to be conducting and nonconductive. The keying pulse UT operates the switch 7 in the sense of a time window so that only a portion U2 of the voltage UP is evaluated. The regulation voltage Ur1, which is a measure for the actual deviation of voltage U5 from the reference voltage VREF, is obtained from the capacitor 15 as a function of the voltage U2, which is keyed in a time selective manner by the rectifier 8. The comparator unit 9 compares voltage Ur1 with a reference voltage Ur3 from a voltage source 10. The regulation voltage Ur2 obtained from the comparison controls a pulse width modulator 11 to adjust the width of pulse 2 to stabilize the operating voltages U1 through U5. Thus, the criterion for the regulation voltage Ur2 is the amplitude of a portion U2 of voltages US or UP during the time window from time t4 to t5. The time window between times t4-t5 is approximately 10-20 per cent of the duty cycle of the transistor T1. The keying pulse UT must extend over the time period t4-t5. Accordingly, as shown in FIG. 3, keying pulse UT is made longer to extend between times t2 and t5 because this pulse can be better derived from the circuit. Also, the portion of voltage UP between times t2 and t4 is switched by means of a switch 7. However, the negative portion is suppressed by the diode 8 so that only the voltage U2 between times t4 and t5 is transmitted by the diode 8 and contributes to the generation of voltage Ur1. The inventive circuit has several additional advantages. Typically, an additional shunting resistor in parallel to the charging capacitor 4 is required, such a resistor is referred to a "bleeder" and provides a path for discharging the capacitor 4. With the inventive circuit shown in FIG. 1 this shunting resistor can have a higher resistance value so that less power is consumed. Also, depending upon the demand, the shunting resistor can also be left out completely as a function of the effect of the transistor T2.

Figure 2:
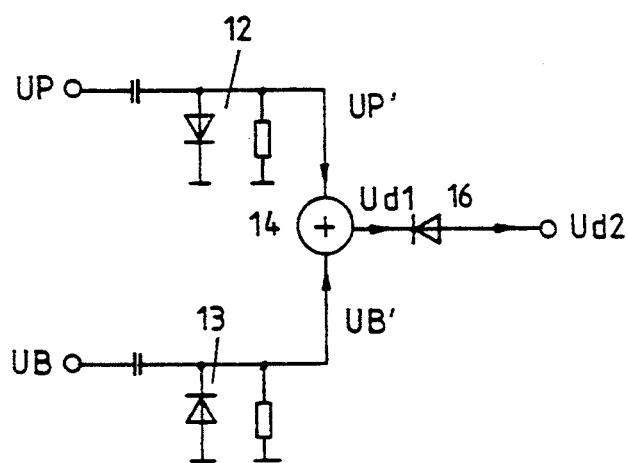
FIG. 2 is a preferred embodiment for carrying out the second technique.

FIG. 2 shows another preferred embodiment for generating the keying pulse UT. The voltage UP' is derived from the voltage UP using the differential element 12. The voltage UB' is derived from the voltage UB using the differential element 13 at the base of T1. Voltages UP' and UB' are added in the adding element 14 thereby creating the voltage Ud1. The negative pulses UP' at t1 and t5 and the positively directed pulses UB' at t1 and t5 are added and partially compensate themselves whereas the negative voltage in UP' at t4 remains. Using the diode 16, the voltage Ud2 is derived from the voltage Ud1, the former having a negative peak at the time t4. This voltage Ud2 can be used in a pulse shaper or in a monostable circuit to generate the keying pulse UT during the time window between times t4 and t5.

We claim:

1. A switch mode power supply comprising a transformer having a primary winding and a secondary winding switching means for coupling a DC source to said primary winding, rectifying means coupling said secondary winding to a load, unidirectional coupling means poled opposite to said rectifying means for passing a reverse current, representative of the voltage applied to said load, through said secondary winding, and means for controlling said switching means in response to said reverse current, said means for controlling said switching means comprising a winding of said transformer coupled through a switch and a rectifier to said switching means, said switch being conductive only during a predetermined time window.

2. The power supply of claim 1, in which said time window has a predetermined temporal position within the operating cycle of said switching means.

3. The power supply of claim 1, in which said time window is approximately 10-20% of the operating cycle of said switching means.

* * * * *